Sept. 19, 1944.   F. W. SCHWINN   2,358,738
CUSHIONED HANDLEBAR
Original Filed Jan. 5, 1942
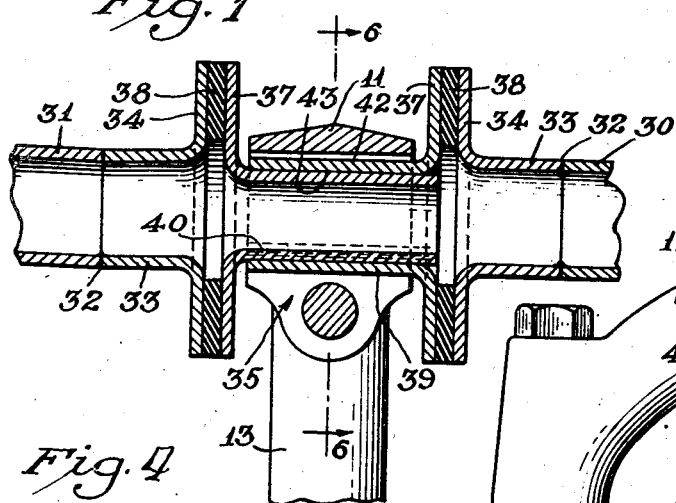

Patented Sept. 19, 1944

2,358,738

UNITED STATES PATENT OFFICE 2,358,738

CUSHIONED HANDLE BAR

Frank W. Schwinn, Chicago, Ill.

Original application January 5, 1942, Serial No. 425,600. Divided and this application April 10, 1944, Serial No. 530,285

14 Claims. (Cl. 74—551.2)

This invention relates to a bicycle handlebar construction which is cushioned against road shocks and vibrations.

The present application is a division of my copending application Serial No. 425,600, filed January 5, 1942.

A salient object of the present invention is to provide an excellently and adequately cushioned handlebar of composite construction that may be assembled with the clamping eye of a bicycle steering post without threading the handlebar through the clamping eye.

Another object of the invention is to provide a bicycle handlebar comprising generally similar halves, each having end portions cushioned-connected together, that have juxtaposed telescoping extremities which are received within the embrace of the clamping eye of a bicycle steering post and effectively are there held against movements relative to each other or said clamping eye.

Another object of the invention is to provide a sturdy and generally improved cushioned handlebar that may be economically manufactured and that may be easily assembled with and disassembled from a bicycle steering post of preferred conventional construction.

Other objects, features and advantages of my invention will appear from the following detailed description wherein reference is made to the accompanying sheet of drawings in which:

Fig. 1 is a fragmentary longitudinal sectional view through the mid-portion of the handlebar of the present invention;

Fig. 2 is a vertical sectional view taken substantially along the line 6—6 of Fig. 1;

Fig. 3 is an exploded assembly view; and

Fig. 4 is a fragmentary side elevational view, partially broken away to expose certain details, of a slight variant of the structure depicted in Figs. 1 to 3 inclusive.

Similar characters of reference refer to similar parts throughout the several views.

The handlebar of the present invention comprises identically constructed but complementary left and right handlebar sections or arms 30 and 31, respectively, each of which is secured at its inner extremity as by butt welding 32 to the end of a short tubular stem 33 formed concentrically integral with an axially facing, radially extending flange 34 of substantial area. The flanges 34 may be two and a half to three times as great in diameter as the handlebar tube, for which ⅞ inch tubing may be used.

A concentric spaced relationship of the flanges 34 is determined by a clamp seat structure 35 which includes flat, axially facing annular flanges 37 complementary to and opposing the flanges 34. The opposing pairs of flanges 34, 37 are secured in spaced, face-to-face relation by means of identical resilient cushions 38 which are preferably disk rings of rubber intimately bonded directly to the engaged faces of the flanges.

The density and tensile strength of the material of the connecting cushions 38 is such that the flanges 34 may rock to a limited extent rotatively relative to the associated flanges 37 as well as about any diametrical axis. The resiliency of the rubber cushions causes them to act as torsion springs to return the flanges to normal when relieved of the forces which have caused the rocking movement thereof. Moreover, due to the complete separation of the opposing flanges 34 and 37 and their entire dependence upon the interposed resilient cushions 38 for union, limited relative axial movement of the flanges is permitted by compression or stretching of the cushions. As a result of this complete cushioned separation of the flanges and the limited substantially universal movement permitted to the flanges 34 relative to the companion flanges 37, shocks or vibrations which might otherwise be transmitted from the clamp seat 35 to the handlebar arms 30 and 31 are effectually dampened.

In order to avoid the conventional threading of the handlebar through the clamping eye in either assembly or disassembly operations, the clamp seat 35 is formed of axially separable telescoping members. One of the flanges 37 is formed with an axial, tubular shank 39 which is preferably of substantially the same external diameter as a conventional clamp seat ferrule so as to be snugly embraced by the eye clamp 11 when the latter is tightened. The other flange 37 is formed with an axial tubular shank 40 of approximately the same external diameter as the internal diameter of the shank 39 into which the shank 40 is adapted to fit in slidable telescopic relation.

Thorough gripping of the shank 40 against longitudinal separation from the shank 39 is assured by providing the shank 39 with a plurality of longitudinal slots 41 which separate it into a plurality of relatively yieldable segments that are driven tightly against the periphery of the shank 40 by the pressure exerted by the conventional eye clamp 11 formed at the end of a gooseneck extension 12 of a bicycle steering post 15. Relative rotary movement of the shanks 39 and 40 is prevented by means such as a longitudinal inwardly extending bead 42 formed in one of the segments of the shank 39 which fits slidably into a complementary longitudinal groove 43 formed in the shank 40. The bead and groove arrangement also assures proper relative adjustment of the handlebar sections 30 and 31, during assembly.

Instead of a longitudinally slidable interfitting relationship of the clamp seat shanks, a threaded connection may be provided as shown in Fig. 8. Thus, the outer shank, identified by the numeral 44, may be formed with internal threads 45 to engage external threads 47 formed on the inner shank, identified by the numeral 48. Longitudinal slots 49 in the outer shank 44 assure thorough gripping of the inner shank 48 to hold the same against relative rotary movement after the clamping eye has been tightened against the seat.

It will be apparent that the novel handlebar construction of my present invention is effectively protected against shocks and vibration because each handle grip section is separately insulated by a generously proportioned absorbing cushion. A special advantage of the relatively large engagement areas of the cushions resides in the practicability of thereby securing the handle grip sections to the clamp seat structure solely by the cushions, thus avoiding the use of any inter-connecting structure of a type through which vibration might be transmitted from the steering post through the clamp seat to the handle grip sections. It may also be noted that these improvements and refinements have been incorporated in the handlebar in such a manner as to enable use of the handlebar with a conventional standard size of steering post clamp, thus rendering the handlebar available for practically unlimited use.

Having thus illustrated and described two preferred embodiments of my present invention, what I claim as new and desire to secure by Letters Patent of the United States is:

1. In a handlebar, a pair of substantially spaced apart flanges each carried by one of a pair of telescoping members receivable within the embrace of a steering post clamping eye disposed between said flanges, a pair of handlebar arm sections each provided at one end with a flange disposed adjacent to the flange of one of the telescoping members, and a stratum of cushioning material disposed between and attached to the flanges of each pair of adjacent flanges.

2. In a handlebar, a pair of substantially spaced apart flanges each carried by one of a pair of telescoping members receivable within the embrace of a steering post clamping eye disposed between said flanges, a pair of handlebar arm sections each provided at one end with a flange disposed adjacent to the flange of one of the telescoping members, a stratum of cushioning material disposed between and attached to the flanges of each pair of adjacent flanges, a longitudinal rib carried by one of said telescoping members, and a longitudinal groove receiving said rib carried by the other of said telescoping members.

3. In a handlebar, a pair of substantially spaced apart flanges each carried by one of a pair of telescoping members receivable within the embrace of a steering post clamping eye disposed between said flanges, a pair of handlebar arm sections each provided at one end with a flange disposed adjacent to the flange of one of the telescoping members, a stratum of cushioning material disposed between and attached to the flanges of each pair of adjacent flanges, and a plurality of spaced apart longitudinal slots formed in the outer one of said telescoping members.

4. In a handlebar, a pair of substantially spaced apart flanges each carried by one of a pair of telescoping members receivable within the embrace of a steering post clamping eye disposed between said flanges, a pair of handlebar arm sections each provided at one end with a flange disposed adjacent to the flange of one of the telescoping members, a stratum of cushioning material disposed between and attached to the flanges of each pair of adjacent flanges, and inter-engaging means preventing relative rotation between said telescoping members.

5. In a handlebar, a pair of substantially spaced apart flanges each carried by one of a pair of telescoping members receivable within the embrace of a steering post clamping eye disposed between said flanges, a pair of handlebar arm sections each provided at one end with a flange disposed adjacent to the flange of one of the telescoping members, a stratum of cushioning material disposed between and attached to the flanges of each pair of adjacent flanges, a plurality of spaced apart longitudinal slots formed in the outer one of said telescoping members, and inter-engaging means carried by the telescoping members serving to prevent their relative rotation.

6. In a handlebar, a pair of substantially spaced apart flanges each carried by one of a pair of telescoping members receivable within the embrace of a steering post clamping eye disposed between said flanges, a pair of handlebar arm sections each provided at one end with a flange disposed adjacent to the flange of one of the telescoping members, and a stratum of cushioning material disposed between and attached to the flanges of each pair of adjacent flanges, said telescoping members being screw-threaded one within the other.

7. In a handlebar, a pair of substantially spaced apart flanges each carried by one of a pair of telescoping members receivable within the embrace of a steering post clamping eye disposed between said flanges, a pair of handlebar arm sections each provided at one end with a flange disposed adjacent to the flange of one of the telescoping members, and a stratum of cushioning material disposed between and attached to the flanges of each pair of adjacent flanges, said telescoping members being screw-threaded one within the other and the outer one of said screw-threaded members being longitudinally slotted.

8. In a handlebar, a pair of substantially spaced apart flanges each carried by one of a pair of telescoping members receivable within the embrace of a steering post clamping eye disposed between said flanges, a pair of handlebar arm sections each provided at one end with a flange disposed adjacent to the flange of one of the telescoping members, and a stratum of cushioning material disposed between and attached to the flanges of each pair of adjacent flanges, one of said telescoping members being longitudinally slotted.

9. A handlebar comprising, in combination, a pair of separate handle grip sections, a separate shank member for each of said sections, cushioning means permanently uniting each of said shank members with its respective handle grip section, said shank members being in telescopic interengagement to form a seat for engagement by the eye clamp of a bicycle steering post.

10. A handlebar comprising two halves each comprising a pair of members connected end to end by a cushioned joint of substantially greater diameter than the connected members, corresponding ends of said handlebar halves being telescoped one within the other, and said telescoping ends being receivable within the embrace of a steering post clamping eye lying between said cushioned joints.

11. In a handlebar, a pair of separately formed handlebar arm sections having proximate ends provided with radial flanges, a pair of telescoping members provided with radial flanges disposed in proximate opposed spaced apart relationship to the flanges of the arm sections, said telescoping members being receivable within the embrace of the clamping eye of a steering post, and a stratum of cushioning material disposed between and bonded to the flanges of each pair of opposed spaced apart flanges.

12. In a handlebar, a pair of telescoping members provided at opposite ends with radial flanges, said telescoping members being receivable within the embrace of a steering post clamping eye disposed between and adjacent to said flanges, a pair of handlebar arm sections each provided with a radial flange disposed in proximate opposed spaced apart relationship to the radial flange of one of said telescoping members, and a stratum of cushioning material disposed between and attached to the flanges of each pair of proximate opposed spaced apart flanges.

13. In a handlebar, a pair of substantially spaced apart flanges each carried by one of a pair of telescoping members receivable within the embrace of a steering post clamping eye disposed between and adjacent to said flanges, a pair of handlebar arm sections each provided at one end with a flange disposed in proximate parallel relationship with a flange of one of the telescoping members, and a stratum of cushioning material disposed between and attached to the flanges of each pair of proximate parallel flanges.

14. In a handlebar, a pair of substantially spaced apart flanges each carried by one of a pair of telescoping members receivable within the embrace of a steering post clamping eye disposed between and adjacent to said flanges, a pair of handlebar arm sections each provided at one end with a flange disposed adjacent to a flange of one of the telescoping members, and a stratum of cushioning material disposed between and attached to the flanges of each pair of adjacent flanges.

FRANK W. SCHWINN.